June 3, 1930.  J. P. JOHANSSON  1,761,832
ADJUSTABLE SUPPORT FOR ELECTRIC LAMPS
Filed Nov. 4, 1927   2 Sheets-Sheet 1

INVENTOR
JOHAN P. JOHANSSON
By
ATTORNEY

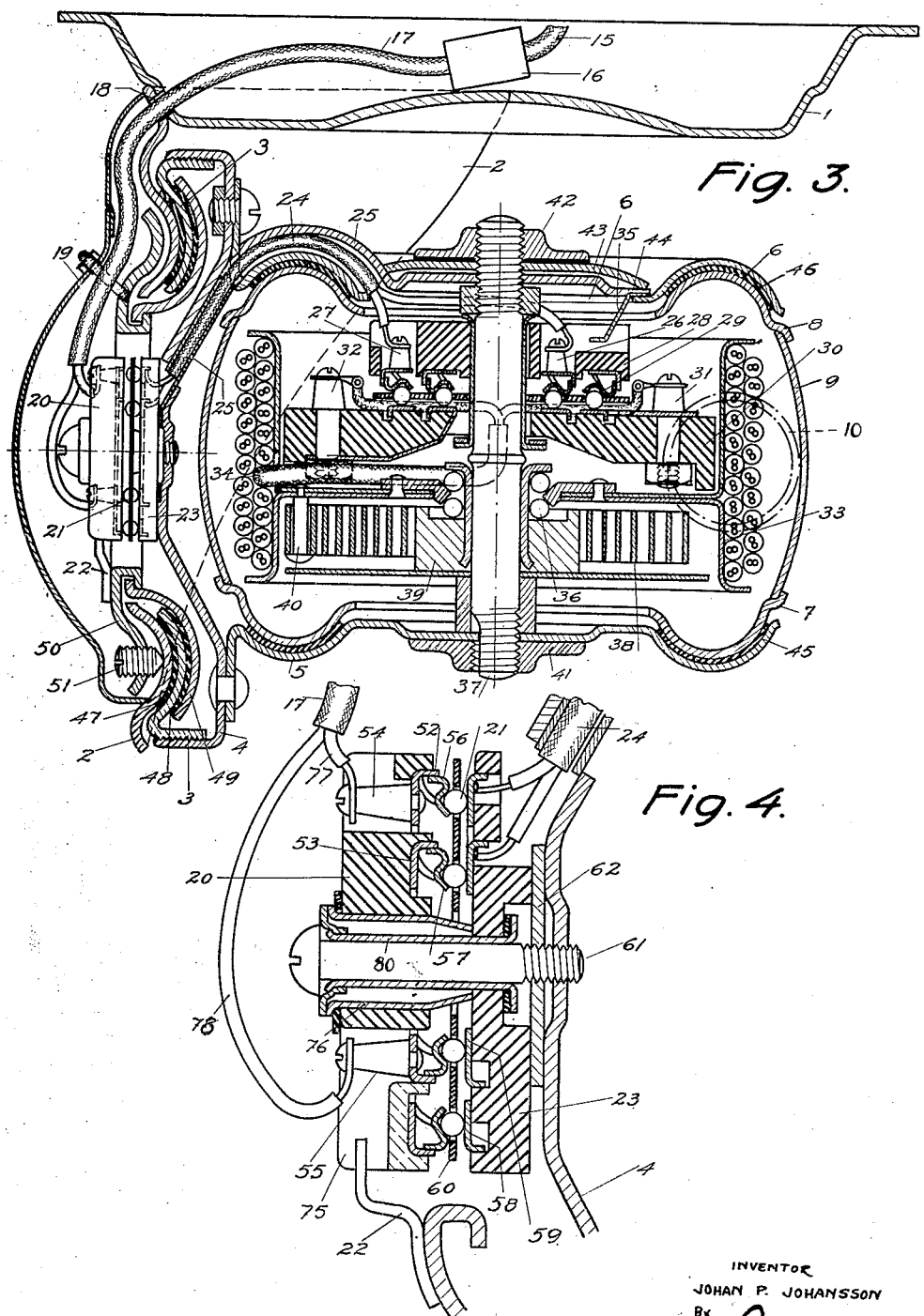

Patented June 3, 1930

1,761,832

UNITED STATES PATENT OFFICE

JOHAN PETTER JOHANSSON, OF ENKOPING, SWEDEN

ADJUSTABLE SUPPORT FOR ELECTRIC LAMPS

Application filed November 4, 1927. Serial No. 231,047.

The invention relates to a support for electric lamps, which contains two rotary joints, arranged at right angles to one another and a telescopic stem extending from the last one of these joints, and the purpose of the invention is to provide a stable structure, in which the electric wires are well protected and at the same time all danger of breaking or twisting the wires, when adjusting the rotary joints or the telescopic stem, is avoided.

The annexed drawings show an embodiment of the invention.

Figure 1:
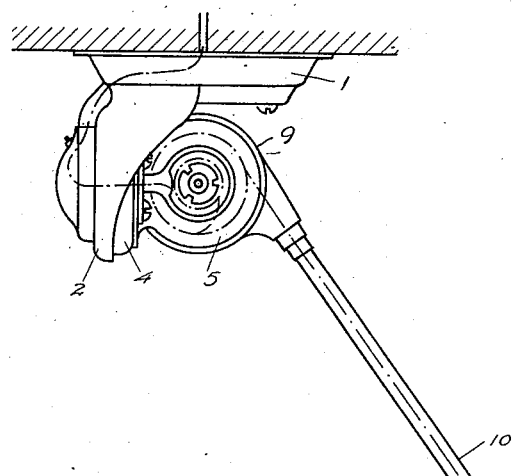
Figure 2:
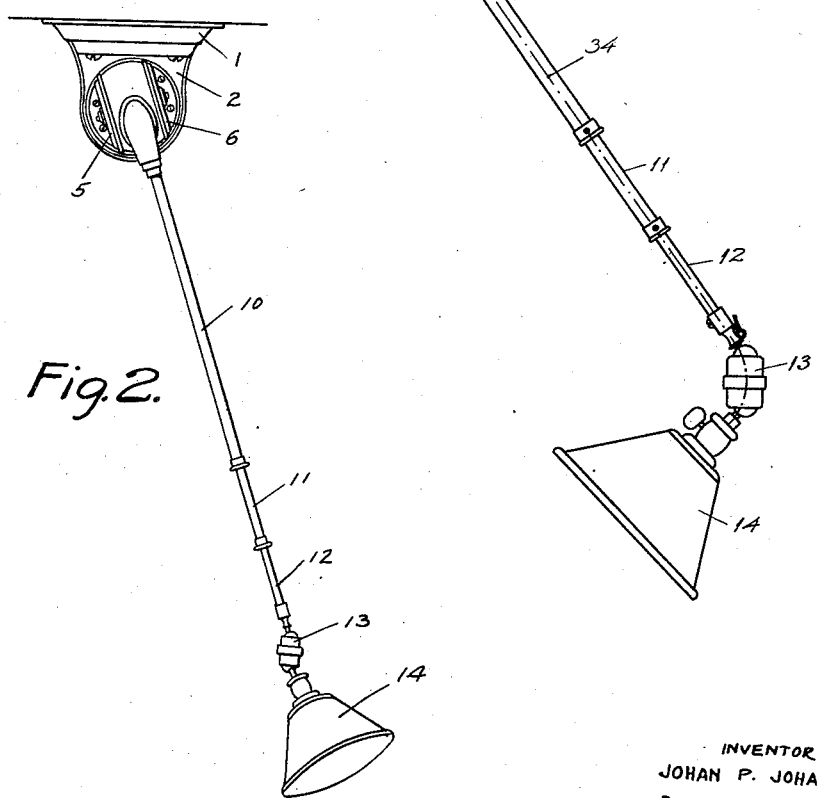

Figs. 1 and 2 show the support in its entirety in two side views. Fig. 3 shows a section through the top part of the support on a larger scale and Fig. 4 shows a section through a part of Fig. 3 on a still larger scale.

Referring to Figs. 1 and 2, the support consists of a plate 1, adapted to be attached to a ceiling, a wall or the like, a bracket 2 rigidly fixed to said plate, a holder 4 mounted to rotate in said bracket, a pair of discs 5, 6 fixed to said holder, a cover 9 rotating in said discs, a telescopic stem 10, 11, 12 attached to said cover 9 and a rotary joint 13 detachably mounted in the outer end of the telescopic tube 12 and connected with the holder of the electric lamp, through which joint 13 the wire 34, passing through the telescopic stem is drawn to have its outer end connected with the lamp-holder in a usual manner.

The structure of the arrangement containing the top parts 1, 2, 4, 5 and 9 will now be described with reference to Figs. 3 and 4.
1 is the plate, 2 the bracket attached thereto and 4 the holder. This holder 4 is rotatably mounted at the bracket 2 by means of an annular disc 3 attached to the holder 4, said disc being pressed against the bracket 2 by means of a disc 49 which, in its turn, is acted upon by a disc 50 provided with set-screws 51 acting upon the opposite side of the bracket 2. Washers 47, 48 of a suitable material, for instance fiber, are inserted between the bracket 2 and the disc 3 and between the disc 3 and the disc 49.

The centre of motion of the holder 4 has attached to it one ball-race 23 of a double row thrust-bearing the second ball-race 20 of which is prevented from turning in relation to the bracket 2 by means of a projection or stem 22 extending from the disc 50 into a slot 75 located in the ball-race 20. The double row thrust-bearing is positioned by a bolt 61 screwed in the holder 4 on which bolt the ball-race 20 is rotatably mounted by means of a bush 76 placed on the bolt. The inner end of said bush rests against the ball-race 23 while the outer end is acted upon by a sleeve 80 joining the ball-races 20, 23 so that the ball-race 23 is pressed against the holder 4. To ensure a sufficient friction between the ball-race 23 and the holder 4 a washer 62 of rubber or the like is inserted between these two parts.

The ball-races 20 and 23 are carried out in china or any other insulating material and are each provided with two concentric metallic contact-rings 52, 53 and 58, 59 respectively, against which the two ball-rows 21 rest. To ensure the contact between the ball-rows 21 and the rings 52, 58 and 53, 59 respectively there are, as shown in Fig. 4, a pair of additional elastic rings 56, 57 inserted between the ball-rows 21 and the rings 52, 53. Each ring 52, 53 is, further, connected with a terminal 54 and 55 respectively in order to connect the two wires 77, 78 of the double strand 17. 60 is a ball cage, of fiber or the like. The double strand 17 is, as shown, inserted from the top side of the plate 1, at which place it is connected with the network 15 by a plug switch 16 or the like. From the top side of the plate the double strand 17 is drawn through an aperture 18 in the plate 1 and the bracket 2 to be extended along the outside of the bracket 2 and connected with the terminals 54, 55. To protect the strand 17 on the course between the plate 1 and its terminals as well as to protect the ball-bearing 20, 21, 23 a protecting cover 19 is screwed at the back side of the bracket 2.

Fixed to the holder 4 is a pair of rings 5 and 6 having circular friction faces. These rings rest, by means of fiber discs 45, 46 against a pair of rings 7 and 8, which form the end-walls of the cover 9. To obtain an adjustable friction between the rings 5, 6 on one hand and the rings 7, 8 on the other hand there is a bolt 37 arranged, having its ends provided with nuts, of which one nut 41 directly rests against the ring 5, while the other nut 42 rests against the ring 6 by means of a pair of washers 43 and 44, of which the last mentioned one is provided with a lateral projection 25, which serves to cover the wire 24 extending from the ball-race 23, said wire 24 having its other end drawn through the central aperture of the ring 8 and connected with the terminals 26, 27, which are fixed in the one of the ball-races 28, 30 of a double-row ball-bearing 28, 29, 30 of a design similar to the ball-bearing 20, 21, 23 and placed on the bolt 37. On the bolt 37 a winding-up drum 33 is, also, rotatably mounted by means of a ball-bearing 36. The ball-race 28 is rigidly fixed to the bolt 37, while the ball-race 30 is rigidly connected with the drum 33. One end of the strand 34, wound up on the drum 33, has the one conductor connected with the terminal 31, while the second conductor is connected with the terminal 32. The other end of the strand 34 is drawn through the tube 10, connected with the cover or casing 9.

In order to obtain an automatic winding-up of the strand 34 on the drum 33, this drum is acted upon by a spiral spring 38, one end of which is fixed to the bolt 37 by means of the part 39 while the other end is connected with the drum by means of the pin 40.

Having now particularly described the nature of my invention and the manner of its operation, what I claim is:

1. Adjustable support for electric lamps in which the lamp is supported by a telescopic tube connected with a rotary friction joint which is connected with a second friction joint arranged in right angles to the first friction joint characterized by the fact that the first friction joint is hollow and contains a spring-actuated winding-up drum for an electric two-wire strand extending through the telescopic tube 2. Adjustable support for electric lamps in which the lamp is supported by a telescopic tube connected with a rotary friction joint which is connected with a second friction joint arranged in right angles to the first friction joint characterized by the fact that the first friction joint is hollow and contains a spring-actuated winding-up drum for an electric two-wire strand extending through the telescopic tube, the two-wire strand on the winding-up drum being connected with one side of a double-row ball bearing through which the electric current is transported and from the other side of which ball bearing the current in another two-wire strand leads further to the second friction joint.

3. Adjustable support for electric lamps in which the lamp is supported by a telescopic tube connected with a rotary friction joint which is connected with a second friction joint arranged in right angles to the first friction joint characterized by the fact that the first friction joint is hollow and contains a spring-actuated winding-up drum for an electric two-wire strand extending through the telescopic tube, the two-wire strand on the winding-up drum being connected with one side of a double-row ball bearing through which the electric current is transported and from the other side of which ball bearing the current in another two-wire strand leads further to the second friction joint, in which also a double-row ball bearing is mounted.

4. Adjustable support for electric lamps in which the lamp is supported by a telescopic tube connected with a rotary friction joint which is connected with a second friction joint arranged in right angles to the first friction joint characterized by the fact that the first friction joint is hollow and contains a spring-actuated winding-up drum for an electric two-wire strand extending through the telescopic tube, that part of the first friction joint, which is connected with the telescopic tube, forming a hollow body having two annular friction surfaces, arranged on each side of the telescopic tube.

5. Adjustable support for electric lamps in which the lamp is supported by a telescopic tube connected with a rotary friction joint which is connected with a second friction joint arranged in right angles to the first friction joint characterized by the fact that the first friction joint is hollow and contains a spring-actuated winding-up drum for an electric two-wire strand extending through the telescopic tube, that part of the first friction joint, which is connected with the telescopic tube, forming a hollow body having two annular friction surfaces, arranged on each side of the telescopic tube, and a screw leading through the joint serving to adjust the press on the friction surfaces.

6. A universal supporting electric fixture comprising a plate for attachment, a bracket integral with and perpendicular to said plate, a holder rotatably mounted in said bracket, a pair of discs positioned in spaced relation on said holder, a cover rotatably mounted between said pair of discs containing a spring actuated drum co-axial therewith, an electric strand wound upon said drum, a first rolling electrical contact means between said drum and said cover and a second rolling electrical contact means between said holder and said bracket connected to said first rolling electrical contact means and said strand 7. A universal supporting electric fixture comprising a plate for attachment, a bracket integral with and perpendicular to said plate, a holder rotatably mounted in said bracket, a pair of discs positioned in spaced relation on said holder, a cover rotatably mounted between said pair of discs containing a spring actuated drum co-axial therewith, an electric strand wound upon said drum, a first rolling electrical contact means comprising a ball race co-axial with and attached to said spring actuated drum and having two concentric contact rings connected to said strand, a second ball race co-axial with and attached to said cover and having two concentric contact rings, a pair of concentric ball rows between opposite pairs of said contact rings and an insulating ball cage surrounding said ball rows, and a second rolling electrical contact means similar and electrically connected to said first rolling electrical contact means positioned between said holder and said bracket.

JOHAN PETTER JOHANSSON.